June 9, 1953   T. J. HARRIMAN ET AL   2,641,423
AIRCRAFT UNDERCARRIAGE
Filed Sept. 27, 1951   2 Sheets-Sheet 1

INVENTORS
Thomas J. Harriman and
Francis P. Bassett
BY
Bean, Brooks, Buckley & Bean
ATTORNEYS June 9, 1953   T. J. HARRIMAN ET AL   2,641,423
AIRCRAFT UNDERCARRIAGE
Filed Sept. 27, 1951   2 Sheets-Sheet 2
Fig.9.
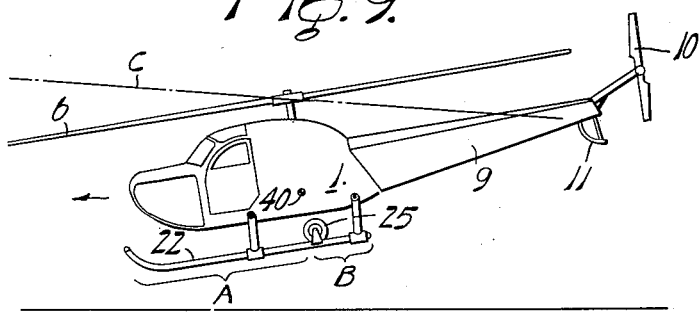
Fig.4.
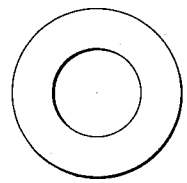
Fig.5.
Fig.10.
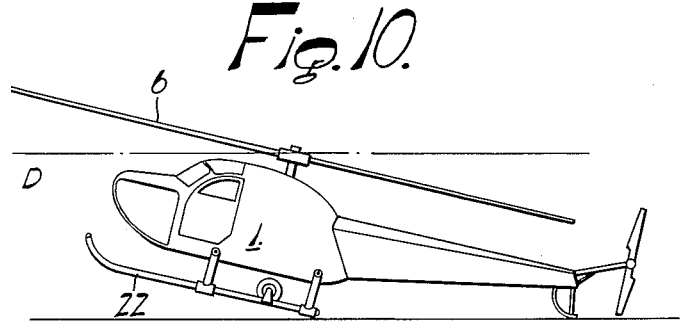
Fig.6.
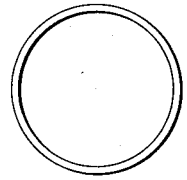
Fig.7.
Fig.11.
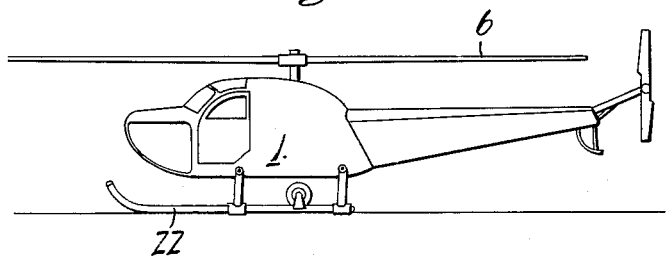
Fig.8.
INVENTORS
Thomas J. Harriman and
Francis P. Bassett
BY Bean, Brooks, Buckley + Bean.
ATTORNEYS
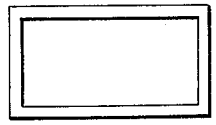

Patented June 9, 1953

2,641,423

UNITED STATES PATENT OFFICE 2,641,423

AIRCRAFT UNDERCARRIAGE

Thomas J. Harriman, Williamsville, and Francis P. Bassett, Lockport, N. Y., assignors to Bell Aircraft Corporation, Wheatfield, N. Y.

Application September 27, 1951, Serial No. 248,483

12 Claims. (Cl. 244—100)

This invention relates to helicopter undercarriage structures, and this application is a continuation-in-part of application Serial No. 149,482 filed March 14, 1950.

Prior aircraft undercarriage arrangements for carrying loads and absorbing shocks incidental to landings have employed either oleo struts or shock cords or some form of friction energy absorbing device on the theory that such devices are mandatory to avoid permanent damage to the undercarriage and/or aircraft structures. However, such shock absorbing devices are relatively expensive and heavy and bulky, and are not best suited to helicopter aircraft for example because of the disadvantages aforesaid and because a highly resilient type undercarriage promotes undesirable rebound. It has now been determined that it is not necessary in the case of helicopter aircraft to impose thereon for normal usage of the aircraft the expense and weight and bulk disadvantages attendant upon the use of such prior arrangements including oleo struts or the like; and that it is only necessary to construct the undercarriage truss structure to plastically absorb "crash" or hard landing forces so as to protect the rest of the aircraft from damage in event of such landings.

The present invention contemplates a novel undercarriage structure for helicopter aircraft such as avoids necessity for incorporation of oleo or friction type energy absorbing devices, while at the same time providing sufficient shock resisting and absorbing characteristics for normal landings. The invention embodies in the undercarriage structure one or more readily replaceable strut or beam elements designed to retain normal shape under normal landing loads but to yield in permanent plastic deformation under "crash" or hard landing conditions. Thus, the deformable element or elements survive normal landings but are arranged to be readily replaceable subsequent to deforming thereof to protect the aircraft from damage under hard landings, preparatory to reuse of the aircraft. However, to function properly in the above respects, the deformable element or elements are preferably designed to avoid buckling when undergoing deformation, so as to avoid collapse of the undercarriage prior to absorption of the landing energy such as would result in damage to the aircraft. The invention is particularly adaptable for example to rotary wing aircraft of the helicopter type which normally land in slowly descending-hovering manner and which can land auto-rotatively with power off without excess shock, whereby landings in such aircraft such as would be rough enough to require the use of oleo shock absorbers or the like are extremely rare and could be classified as "crash landings." The invention also contemplates incorporation of the above mentioned features in a novel "skid" type undercarriage arrangement for helicopter aircraft, permitting improved landing and take-off techniques and providing improved ground stability during landing operations.

Therefore, it is one object of the present invention to provide a novel aircraft undercarriage structure employing an element or elements designed to plastically deform under crash landing loads, without buckling of the deformable element so that it continues to absorb the landing energy as long as applied.

Another object of the invention is to provide a novel undercarriage structure for aircraft or the like wherein the energy of a hard landing is converted into permanent plastic deflection of an inexpensive and readily replaceable structural member or members of the undercarriage structural organization.

Another object of the invention is to provide an improved undercarriage structure for helicopter aircraft or the like wherein yielding of an element or elements thereof in permanent plastic deformation is provided to absorb hard landing energies, thereby preventing damage to the rest of the machine.

Another object of the invention is to provide an improved helicopter aircraft undercarriage framing which comprises a metal tubing truss structure which is of novel design so as to provide adequate resistance to normal landing shocks, while being at the same time adapted to yield in improved manner under crash landing forces so as to absorb crash loads without buckling within practical limits of the structure.

Another object of the invention is to provide a helicopter aircraft undercarriage of the ground skid type which is of optimum structural simplicity and crash landing load absorbing characteristics.

Another object of the invention is to provide a helicopter aircraft ground skid type undercarriage to provide improved ground stability and maneuverability without tripping on rough, uneven, sloping, or soft terrain.

Another object of the invention is to provide an undercarriage of the skid type which includes an improved retractable wheel arrangement to assist in ground handling maneuvers.

Another object of the invention is to provide a helicopter undercarriage arrangement which permits an improved landing and take-off technique.

Other objects and advantages of the invention will appear from the specification hereinafter.

In the drawings:

Fig. 4 is a diagrammatic sectional view through one form of under carriage strut such as may be used in accordance with the invention;

Fig. 5 is a view corresponding to Fig. 4 of another form of strut as may be used in accordance with the invention;

Fig. 6 is a view corresponding to Figs. 4-5, but of a type strut conventionally used in aircraft undercarriage structures;

Figs. 7 and 8 are sectional views corresponding to Figs. 4 and 5, showing still further forms of struts as may be used in accord with the invention; and Figs. 9, 10, 11 are diagrammatic side elevational views of a helicopter of the invention, shown at various stages during performance of a landing technique which is facilitated by the invention.

Figure 1:
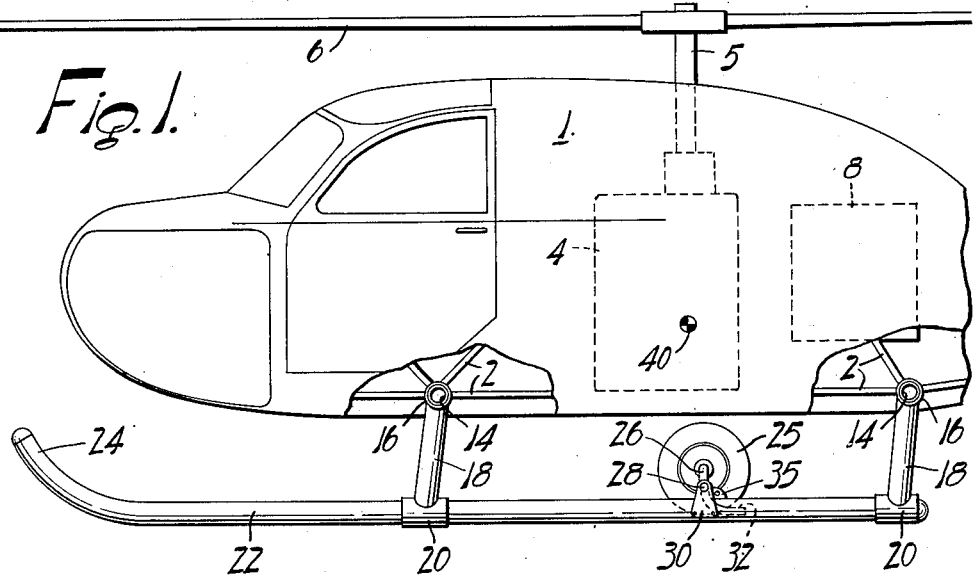
Fig. 1 is a fragmentary side elevation of a helicopter aircraft equipped with an undercarriage of the invention.

The invention is illustrated in the drawing as being embodied in a helicopter aircraft comprising a body portion designated generally at 1 including framing structure as indicated at 2 (Figs. 1-2) supporting the usual helicopter components such as engine 4, lift rotor shaft 5, lift rotor 6, and fuel tank 8. The aircraft body is shown also to include a tail boom portion 9 carrying a tail rotor 10 for directional control, and a tail rotor guard skid 11.

The undercarriage structure of the invention is illustrated in the drawing as one example thereof to include paired transverse beams 14—14 which are anchored to the aircraft body frame work as by means of split collar brackets 16—16; the beams 14 being formed of relatively large diameter and thick wall tubing of a suitable light weight material so as to give the tubes 14 certain load responsive characteristics as will be explained hereinafter.

Figure 2:
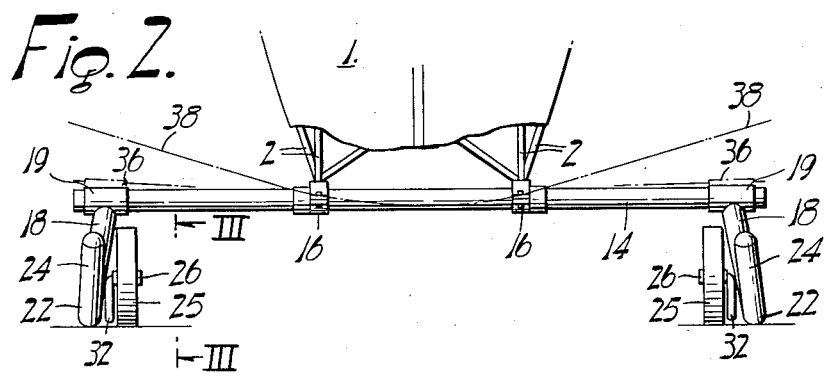
Fig. 2 is a fragmentary front view thereof diagrammatically illustrating functioning of the invention.

The tubes 14—14 are longitudinally dimensioned so as to extend at opposite sides of the aircraft for substantial distances beyond the mounting brackets 16—16; and carry at their outer ends downwardly directed legs 18 which may be conveniently formed of metal tubing stock welded or otherwise suitably attached to the beams 14 as by fittings indicated at 19 (Fig. 2). As shown herein for example, at their lower ends the legs 18 connect as by means of fittings 20 to oppositely disposed skid devices 22 which may also be conveniently formed of light weight metal tubing and arranged to extend generally parallel and longitudinally of the aircraft body at the opposite sides thereunder. Preferably, the front ends of the skids 22 are upturned as indicated at 24 to prevent "stubbing" of the skid devices incidental to landing operations when the aircraft is descending in nose-down attitude.

Figure 3:
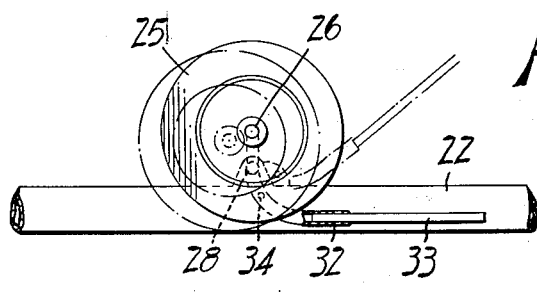
Fig. 3 is a view taken along line III—III of Fig. 2, on a larger scale, showing operation of the retractable wheel control arrangement.

To facilitate ground handling of the aircraft, each of the skid devices 22—22 is provided with a ground wheel 25 carried by a crank-shaped axle 26 having an integral stub shaft portion 28 extending therefrom into journalled relation upon a bracket 30 (Fig. 1) which is fixed to extend rigidly from the corresponding skid member. The axis member 26 is also formed with a lever arm portion 32 arranged to receive a pry bar 33 (Fig. 3) or other suitable tool to provide the operator with sufficient mechanical advantage so that the wheel 25 may be readily pivoted about the stub shaft portion 28 and downwardly against the ground so as to assume the weight of the aircraft whenever it is desired to trundle the aircraft as to and from its hangar. As indicated at 34, the arm 32 may be apertured, and as indicated at 35 the bracket 30 may also be apertured to enable the operator to lock the wheel 25 in "down" position as by means of a pin or the like. As shown in Fig. 1, the wheels 25—25 will be preferably located on the skid devices so as to be in the region of the longitudinal station of the center of gravity of the aircraft, so that when the aircraft is on the ground and resting on the wheels 25—25 it will be substantially balanced thereon.

As explained hereinabove, it is a particular feature of the present invention that the beam portions 14—14 of the undercarriage structure are provided in the form of tubes of lightweight yet initially springy metal, and that the tubes 14—14 are of relatively thick wall form compared to standard stock tubings. For example, in a helicopter aircraft weighing approximately 2,000 pounds, a very satisfactory undercarriage of the type illustrated and described hereinabove may be constructed to include a pair of cross beams of approximately 7½ feet overall length made from aluminum alloy tubing of the kind designated in the trade as 24 ST of 2¾ inches diameter with wall thickness of approximately .156 inch as distinguished from a standard aluminum alloy aircraft tubing stock thickness of .083 inch for the same diameter tubing. Thus, in this example the beams 14—14 comprise aluminum alloy tubing which may be described as having a diameter-to-wall thickness ratio in the neighborhood of or approximately 18 to 1, or factor in the neighborhood of 18. In such construction incidental to normal landing operations the beam members 14—14 spring slightly within the elastic limits of the beams as illustrated by the broken line showing 36 thereof in Fig. 2; but under crash landing conditions or the like, the beams will yield in plastic deformation as illustrated at 38 while the thick walled form of the tubes enables them to successfully resist tendencies to buckle. It is, of course, well known that buckling of any beam structure results in immediate termination of substantial resistance to the load; and thus an undercarriage constructed of members that are susceptible to buckling under crash landing loads will invariably collapse and subject the aircraft to damage. In the case of the present invention, however, such results are prevented by the relatively simple and inexpensive undercarriage construction as illustrated and described herein whereby the load carrying element or elements absorb excessive landing loads by undergoing plastic deflection while continuing to provide approximately the same order of resistance to the landing loads even after deflection such as indicated at 38.

Otherwise stated, the invention contemplates provision in a helicopter landing gear structure of a member or members capable of yielding sufficiently to absorb excessively hard landing impacts before the aircraft design ultimate load is reached; such member or members to consist of unusually thick walled tubing, the wall thickness of which is sufficient to preclude premature crippling or buckling of the tubing during plastic deflection, and thin enough to insure when crash-loaded useful plastic deformation of as much of the tubing material as possible. The term "premature" as used hereinabove extensive yielding has occurred and before the material has reached either its ultimate tensile strength or its block compressive strength. Thus, in order that the tubing will continue to yield (as distinguished from buckling) while bending, the tubing wall must be thicker than conventionally used in aircraft undercarriage strut or beam or truss arrangements, because if the tubing wall is too thin it will simply cripple or buckle locally before the tube assumes any substantial degree of bending, thus absorbing only slight energy in such case. On the other hand if the tubing wall is too thick, such as in nearly solid or solid bars or rods, the inner material of the member will not usefully participate in the energy absorbing and bend-resisting operation. Hence, such members would be unduly heavy and otherwise undesirable for the purpose.

The structural members referred to hereinabove may be of any suitable material having a yield point high in relation to the ultimate strength of the material, so that the material will not yield under normal landing conditions. For example, suitable materials may be selected from the aluminum alloys designated in the trade under the classification 24 ST; or a suitable nickel steel such as for example SAE 23-30. In fact, any suitable high duty metal having a long elongation and high strength may be employed. Such metals may be found in the class of chrome, molybdenum or vanadium steel alloys, or steels of the so-called stainless types. Although present day magnesium alloys do not usually possess sufficient elongation in combination with sufficient tensile strength, it is considered possible that such alloys will soon be developed to be suitable for the purpose. In all cases the materials should have an elongation of at least 12%.

It has been determined by experiment that tubing of various sectional shapes may be used within the purview of the invention and that the practical ranges of tube diameter to wall thickness, may be delineated as follows. For example, round sectioned tubing having an outside diameter-to-wall-thickness factor between 25 and 4 may be satisfactorily employed for the purpose; and by way of illustration Fig. 4 shows in section a tube having an outside diameter-to-wall-thickness ratio of about 4 to 1 (or $D/t$ value of about 4). Fig. 5 illustrates in section a tube at the other end of the range; the tube section of Fig. 5 having a value of something in the neighborhood of 25. On the other hand, Fig. 6 illustrates a standard stock tubing section having a value in the neighborhood of 33, such as is conventionally used for undercarriage structural purposes and such as will not plastically deflect as for the purposes of the present invention without buckling. Oval sectioned tubing may also be satisfactorily employed within the purview of the present invention, when the tubing is selected to have a wall thickness-to-radius of long curvature value between .07 and .50; and Fig. 7 illustrates for example an oval tubing having a sectional value in the neighborhood of .07. Similarly, a rectangularly sectioned tube having a wall-thickness-to-loaded width value within the range of .04 to .25 may be satisfactorily employed; Fig. 8 showing by way of example a rectangular tube having a value of the order of .08.

More specifically, the following is a method of determining a practical and efficient energy absorbing landing gear structure that will dissipate excessive landing loads by means of controlled permanent deflections, without experiencing any local instability or failure. To obtain the above structure thick walled circular, elliptical, or square tubes must be used.

From basic deflection formulae it may be seen that:

$$\delta = \iint \frac{1}{R} = dx\,dy$$

and $$\frac{1}{R} = \frac{d\alpha}{dx}$$

where $\delta$=deflection of the bending member at distance $x$.
$R$=radius of curvature of bending member.
$\alpha$=angular deflection of a line normal to R at any distance $x$.

Now establishing the point of yield strain as the limit of the amount of permanent set in the material of the bending structure that will occur under a limit or yield loading and letting $e_c$=compressive strain
$e_t$=tensile strain it may be stated that in a distance $\Delta x$ $$\Delta\alpha = 2\frac{(e_c+e_t)\frac{\Delta x}{2}}{h} = \frac{(e_c+e_t)\Delta x}{h}$$

$$\frac{1}{R} = \frac{(e_c+e_t)dx}{dx\,h} = \frac{e_c+e_t}{h}$$

$$\therefore \delta = \iint \frac{e_c+e_t}{h}dx\,dx$$

letting $\delta e$=elastic deflection up to yield strain
$\delta p$=plastic deflection above yield strain Then $$\delta = \delta e + \delta p = \iint \frac{e_{c_e}+e_{t_e}}{h}dx\,dx + \iint \frac{e_{c_t}-e_{c_e}+e_{t_t}-e_{t_e}}{h}dx\,dx$$

where $e_{c_t}$=compressive strain in the plastic range of the material.
$e_{t_t}$=tensile strain in the plastic range of the material.
$e_{c_e}$=compressive strain in the elastic range of the material.
$e_{t_e}$=tensile strain in the elastic range of the material.

also, we know that $$e = \frac{S}{E}$$

and $$S = \frac{Mc}{I} = \frac{M}{Z} = \frac{Px}{Z}$$

$$\therefore e = \frac{Px}{ZE}$$

where $S$=stress in pounds per square inch.

$E$ = modulus of elasticity of the material in pounds per square inch.
$M$ = bending moment = load times distance to bending section.
$c$ = distance from the neutral axis to the extreme fiber.
$I$ = moment of inertia of the section in bending.

(1)
$$\therefore \delta = \delta_e + \delta_p = \iint \frac{\frac{Px}{Z_c E_{e_c}} + \frac{Px}{Z_t E_{e_t}}}{h} dx\,dx +$$

$$\iint \frac{\frac{Px}{Z_c E_{t_c}} - \frac{Px}{Z_c E_{e_c}} + \frac{Px}{Z_t E_{t_t}} - \frac{Px}{Z_t E_{e_t}}}{h} dx\,dx$$

where
$E_{e_c}$ = elastic compressive modulus of material.
$E_{e_t}$ = elastic tensile modulus of material.
$E_{t_c}$ = plastic compressive modulus of material.
$E_{t_t}$ = plastic tensile modulus of material.

From the kinetic energy equation:

$$\text{Work} = \frac{1}{2} MV^2 = P\delta$$

where
$P = Wa$ = load on bending members in landing gear structure.
$W$ = weight of helicopter.
$a$ = deceleration during landing impact.
$V$ = vertical velocity of helicopter at time of ground contact.

$$M = \frac{W}{g}$$

$g$ = acceleration due to gravity.

$$\therefore \frac{1}{2} \frac{W}{g} V^2 = Wa\delta$$

(2)
$$\therefore \delta = \frac{V^2}{2ag}$$

also the formula for the critical buckling stress of any material in any shape may be written as given below (3)
$$f_{c_{c_r}} = KE$$

where K (for flat plates such as are used in the sides of square tubes) is a function of the ratio of the length and width of the plate plus the square of the ratio of the thickness of the plate to the length of the loaded edge plus a factor to account for the edge restraint of the plate, and K (for circular plates such as are used in round or elliptical tubes) is a function of the ratio of the wall thickness of the tube to the radius of the tube plus a factor to account for the wave form of the tube buckle.

From Equations 1, 2, and 3, the plots of empirical values for the critical buckling stresses of various physical shapes of bending structures that are available and the stress-strain curves of the materials used in the bending structures; the physical dimensions of the bending members, that are required to preclude structural failure due to tube or plate buckling or material rupture, may be determined. This results in a bending structure that will absorb the landing energy of the helicopter by means of uniform elastic and plastic deformation which takes place after the elastic limit is exceeded. The elastic deformation is capable of absorbing and releasing the energies developed in normal helicopter landings and the uniform plastic deformation is of such a controlled magnitude that it will absorb the increased landing energies from abnormal or maximum loadings and dissipate the increased energy as heat, which is developed during the permanent deflection of the structure.

It is another particular feature of the invention that the skid type undercarriage structure of the invention is disposed relative to the aircraft when viewed in side elevation in such manner that the ground contact skid portions 22 extend a substantial distance ahead of the longitudinal station of the center of gravity of the aircraft but to only a relatively short distance therebehind. For example, as shown in Figs. 1, 9, 10, 11, the longitudinal position of the center of gravity of the aircraft and its load combined is invariably at about the location designated at 40; the center of gravity being below the hub of the lift rotor for proper balance of the machine. Thus, as shown in Figs. 9–11, the ground contact skid members 22 each comprise a portion designated A extending forwardly of the longitudinal position of the aircraft center of gravity and a relatively short section designated B extending rearwardly therefrom. This arrangement permits the aircraft to perform preferred landing and take-off techniques with improved facility.

For example, the helicopter of the invention may be maneuvered to fly forwardly toward the desired landing spot in the customary nose-down and rotor forwardly inclined attitude as shown in Fig. 9, until such time as the aircraft has approximately reached the landing spot. The rotor controls are then manipulated to cause the lift rotor to tilt backwardly as indicated at C (Fig. 9) whereby to provide a rearwardly directed rotor pull component for arresting the forward motion of the craft. The aircraft body thereupon momentarily pitches aft into a nose-up attitude as illustrated in Fig. 10 incidental to arrest of the forward momentum of the aircraft. Then, the body pitches forward gently into the normal ground contact horizontal attitude as illustrated in Fig. 11.

Thus, it will be appreciated that during the phase of the landing operation illustrated by Fig. 10, the tail portion of the aircraft necessarily lowers toward the landing surface, and that the undercarriage structure must of necessity be designed to allow contact with the landing surface at this time without excessive pitching. Hence, the short extension of the landing skid portions B behind the aircraft center of gravity permits employment of a landing technique as described hereinabove, while the relatively long extension of the skid portions A ahead of the aircraft center of gravity provides protection for the aircraft body during landing approaches in nose-down attitude. The tail skid device 11 of course operates at all times to protect the tail rotor 10 from damaging contact with the landing surface, and the fact that the skid portions A—B straddle the longitudinal position of the aircraft center of gravity insures ample ground stability for the aircraft when standing on the landing surface. Similarly, the undercarriage arrangement of the invention facilitates take-off because it permits the craft to be tilted or yawed during take-off or landing without danger of upset such as is inherent in conventional landing gear.

The drawing herein illustrates the invention as being embodied in an undercarriage of relatively long and widespread paired skid type which is particularly effective against ground upsets, with the paired horizontal beams designed to take hard landing energy in plastic deformation; but it will of course be understood that the invention may be incorporated in any other type undercarriage and that the deformable element or elements may be provided in any other suitable form in lieu of in the form of the beams 14—14 of the drawing herein. For example, the deformable element might be disposed vertically instead of horizontally, or might be arranged to plastically deform in torsion to absorb the crash landing energy; but in any case the deformable element or elements will be arranged to be inexpensively fabricated and easily replaceable so that subsequent to a crash landing it may be readily and cheaply repaired. It is another feature of the undercarriage arrangement that the leg portions 18 thereof extend downwardly and slightly forwardly from their connections to the beams 14. This braces the skids 22 against rearward drag loads when the craft lands with some forward motion.

Thus, the invention provides in an inexpensive undercarriage construction an improved crash landing energy absorbing system, whereby an undercarriage of improved effectiveness is provided in combination with increased economies of construction and maintenance.

We claim:

1. A helicopter aircraft having an undercarriage comprising an elongated member rigidly connected to the aircraft to extend outwardly in a generally horizontal direction therefrom, and ground contact means fixed to extend downwardly from an outwardly extending portion of said member, said member being an aluminum alloy metal tube having a diameter to wall-thickness factor in the neighborhood of 18, said member being thereby adapted to convert aircraft crash landing energy when applied thereto into permanent plastic deformation of said member without buckling thereof while providing therein substantially constant resistance to plastic deformation.

2. In combination a helicoper aircraft body having an undercarriage comprising a pair of beam members rigidly connected to the aircraft body to extend horizontally transversely thereof and beyond the opposite sides thereof, and a pair of ground contact skid means mounted on the outer ends of said beam members and interconnecting said members, said beam members being aluminum alloy metal tubes of a diameter to wall-thickness factor approximating 18, whereby said tubes are adapted to convert aircraft crash landing energy into plastic deformation of said tubes without buckling thereof.

3. A helicopter aircraft having an undercarriage comprising an elongated member connected to the aircraft to extend outwardly therefrom, and ground contact means fixed to extend from an outwardly extending portion of said member, said member being a metal tube having a diameter to wall-thickness factor in the neighborhood of 18, whereby under crash landing loads said member deforms without buckling thereof while providing therein substantially constant resistance to plastic deformation.

4. In combination a helicopter aircraft body having an undercarriage comprising a pair of beam members connected to the aircraft body to extend beyond the opposite sides thereof, and a pair of ground contact skid means mounted on the outer ends of said beam members and interconnecting said members, said beam members being metal tubes of a diameter to wall-thickness factor approximating 18, whereby under crash landing loads said tubes may plastically deform but without buckling.

5. A helicopter aircraft having an undercarriage comprising only two beam members connected to the aircraft body to extend transversely thereof and beyond the opposite sides thereof at stations spaced longitudinally of the aircraft and straddling the longitudinal position of the center of gravity of the aircraft, a leg fixed to extend downwardly from the outer end of each of said beam members and inclined forwardly therefrom, skid devices fixed to the bottom ends of said legs and extending in substantially parallel relation at opposite sides of said aircraft and longitudinally thereunder, said skid devices extending forwardly of the aircraft center of gravity a substantially greater distance than rearwardly thereof, said beam members being formed of such material and so constructed and arranged as to be slightly springy under normal landing conditions and having sufficient strength to maintain said undercarriage substantially rigid under normal landing loads, said beam members being constructed and proportioned to be subject to plastic deformation without buckling when the stresses to which they are subject incidental to crash landings exceed the elastic limit of the material of said beam members and ground handling wheels mounted to each of said skid members by pivot means and pivotable thereon between retracted and ground contacting positions below the skid means in the region of the longitudinal position of the aircraft center of gravity.

6. In combination with a helicopter aircraft body an undercarriage for ground landing purposes comprising a beam structure connected to the aircraft body to extend transversely and beyond the opposite sides thereof, legs fixed to extend downwardly from the outer ends of said beam structure, and skid devices fixed to the bottom ends of said leg means to extend in substantially parallel relation at opposite sides of said aircraft and longitudinally thereunder, said skid devices being dimensioned to extend fore and aft of the longitudinal position of the aircraft center of gravity but to a substantially greater distance ahead of than behind said center of gravity, said beam structure being formed of such material and so constructed and arranged as to be slightly springy under normal landing conditions and having sufficient strength to maintain said undercarriage substantially rigid under normal landing loads, said beam structure being constructed and proportioned to be subject to plastic deformation without buckling when the stresses to which it is subject incidental to crash landings exceed the elastic limit of the material of said beam structure position.

7. In a helicopter having an airframe and a generally upright rotor shaft having elongated lift rotor blade means extending radially therefrom, ground engaging means comprising generally parallel skids and support structure interconnecting said skids and said airframe, said support structure including transversely and generally horizontally disposed support means formed of such material and so constructed and arranged as to be slightly springy under normal landing conditions while having sufficient strength to maintain said support structure substantially rigid under normal landing loads, said support means also being constructed and proportioned to be subject to plastic deformation without buckling when the stresses to which it is subject incidental to crash landings exceed the elastic limit of the material of said support means.

8. In a helicopter having an airframe and a generally upright rotor shaft having elongated lift rotor blades extending radially therefrom, undercarriage comprising ground engaging skid means and support structure interconnecting said skid means and said airframe, said support structure including a transversely and generally horizontally disposed member formed of such material and so constructed and arranged as to be slightly springy under normal landing conditions and having sufficient strength to maintain said structure substantially rigid under normal landing loads, said member being constructed and proportioned to be subject to plastic deformation without buckling when the stresses to which it is subject incidental to crash landings exceed the elastic limit of the material of said member.

9. In a helicopter aircraft, an undercarriage structure including an elongated member connected to the aircraft to extend outwardly therefrom, and ground contact means fixed to extend downwardly from an outwardly extending portion of said member, said member being a metal tube formed of such material and so constructed and arranged as to be slightly springy under normal landing conditions and having sufficient strength to maintain said structure substantially rigid under normal landing loads, said member being constructed and proportioned to be subject to plastic deformation without buckling when the stresses to which it is subject incidental to crash landings exceed the elastic limit of the material of said member, whereby under crash landing loads said member deforms without buckling thereof while providing therein substantially constant resistance to plastic deformation.

10. In a helicopter aircraft having an airframe and a generally upright rotor shaft with elongate lift rotor blade means extending radially therefrom, an undercarriage comprising a pair of metal tubes disposed transversely of said airframe in generally parallel relation and extending at their opposite ends therebeyond at both sides of said airframe, releasable mounting means detachably connecting each of said tubes to said airframe at spaced positions adjacent opposite sides of said airframe and intermediately of the ends of said tubes, said tubes being detachably connected to said airframe at positions spaced longitudinally thereof and straddling the longitudinal position of the center of gravity of the aircraft, a leg device formed of metal tubing fixed to extend generally downwardly from each end of each of said tubes, and a pair of ground contacting skid members formed of metal tubing fixed to the bottom ends of the leg devices at opposite sides of the aircraft below said airframe to extend in generally parallel relation longitudinally of the aircraft, said skid devices terminating at their rear ends adjacent the positions of connection thereof with the rearmost of said leg devices and extending forwardly beyond the foremost of said leg devices substantial distances and terminating in upturned front end portions.

11. In a helicopter aircraft having an airframe and a generally upright rotor shaft with elongate lift rotor blade means extending radially therefrom, an undercarriage comprising a pair of tubes disposed transversely of said airframe and in generally parallel relation and extending at their opposite ends therebeyond at both sides of said airframe, releasable mounting means detachably connecting each of said tubes to said airframe intermediately of the ends of said tubes, said tubes being detachably connected to said airframe at positions spaced longitudinally thereof and straddling the longitudinal position of the center of gravity of the aircraft, a leg device fixed to extend generally downwardly from each end of each of said tubes, and a pair of ground contacting skid members carried by the leg devices at opposite sides of the aircraft in generally parallel relation longitudinally of the aircraft, said skid devices terminating at their rear ends adjacent the positions of connection thereof with the rearmost of said leg devices and extending substantial distances forwardly of their connections with the foremost of said leg devices and terminating in upturned front end portions.

12. A helicopter aircraft undercarriage as set forth in claim 11, wherein said tubes are formed of such material and so constructed and arranged as to be slightly springy under normal landing conditions and having sufficient strength to maintain said undercarriage substantially rigid under normal landing loads, said tubes being constructed and proportioned to be subject to plastic deformation without buckling when the stresses to which they are subject incidental to crash landings exceed the elastic limit of the material of said tubes.

THOMAS J. HARRIMAN.
FRANCIS P. BASSETT.

References Cited in the file of this patent

UNITED STATES PATENTS

| Number | Name | Date |
|---|---|---|
| 665,184 | Creighton | Jan. 1, 1901 |
| 1,112,731 | Twombly | Oct. 6, 1914 |
| 1,134,657 | Wisted | Apr. 6, 1915 |
| 1,508,366 | Klemm | Sept. 9, 1924 |
| 1,752,416 | Cheesman | Apr. 1, 1930 |
| 2,493,296 | Labensky | Jan. 3, 1950 |
| 2,498,976 | Wittman | Feb. 28, 1950 |
| 2,534,206 | Patecell | Dec. 12, 1950 |

FOREIGN PATENTS

| Number | Country | Date |
|---|---|---|
| 12,247 | Norway | Oct. 12, 1903 |
| 14,514 | France | Oct. 19, 1911 |
| | (Addition to No. 420,322) | |
| 100,532 | Great Britain | Apr. 27, 1917 |
| 258,608 | Italy | Mar. 7, 1928 |
| 274,167 | Great Britain | July 7, 1927 |
| 442,420 | France | Apr. 10, 1912 |